US012406580B2

(12) United States Patent
Sugiyama

(10) Patent No.: US 12,406,580 B2
(45) Date of Patent: Sep. 2, 2025

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Minako Sugiyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/509,508

(22) Filed: Nov. 15, 2023

(65) Prior Publication Data

US 2024/0169835 A1 May 23, 2024

(30) Foreign Application Priority Data

Nov. 21, 2022 (JP) ................................ 2022-185877

(51) Int. Cl.
*G08G 1/0967* (2006.01)

(52) U.S. Cl.
CPC .............................. *G08G 1/096791* (2013.01)

(58) Field of Classification Search
CPC ................................................ G08G 1/096791
See application file for complete search history.

(56) References Cited

U.S. PATENT DOCUMENTS 10,663,970 B2 * 5/2020 Park ..................... G05D 1/0212
2011/0148612 A1 * 6/2011 Nakazono ............... G01S 7/527 340/435
2017/0113686 A1 * 4/2017 Horita ................... B60W 10/20
2018/0297470 A1 * 10/2018 Kim ....................... G08G 1/166
2021/0221289 A1 * 7/2021 Stoe ........................ G01S 13/87
2021/0253025 A1 * 8/2021 Akachi .................... B60Q 9/00
2021/0276551 A1 * 9/2021 Inoue .................. B60W 60/001
2023/0061784 A1 * 3/2023 Agrawal ................ G06V 20/56

FOREIGN PATENT DOCUMENTS

JP 1079100 A 3/1998
JP 2007233864 A 9/2007

* cited by examiner

*Primary Examiner* — Mohamed Barakat
(74) *Attorney, Agent, or Firm* — Dinsmore & Shohl LLP

(57) ABSTRACT

An information processing apparatus is provided on a first vehicle that is a connected vehicle capable of performing V2X (Vehicle-to-Everything) communication. The information processing apparatus has a controller. The controller receives first information including location information of a first object. The controller calculates a first distance based on the location information included in the first information. The first distance is the relative distance between the first object and the first vehicle along a first direction that is perpendicular to the direction of travel of the first vehicle. The controller determines whether or not it is necessary to output second information to caution about the first object based on the first distance.

16 Claims, 8 Drawing Sheets

[Fig. 1]
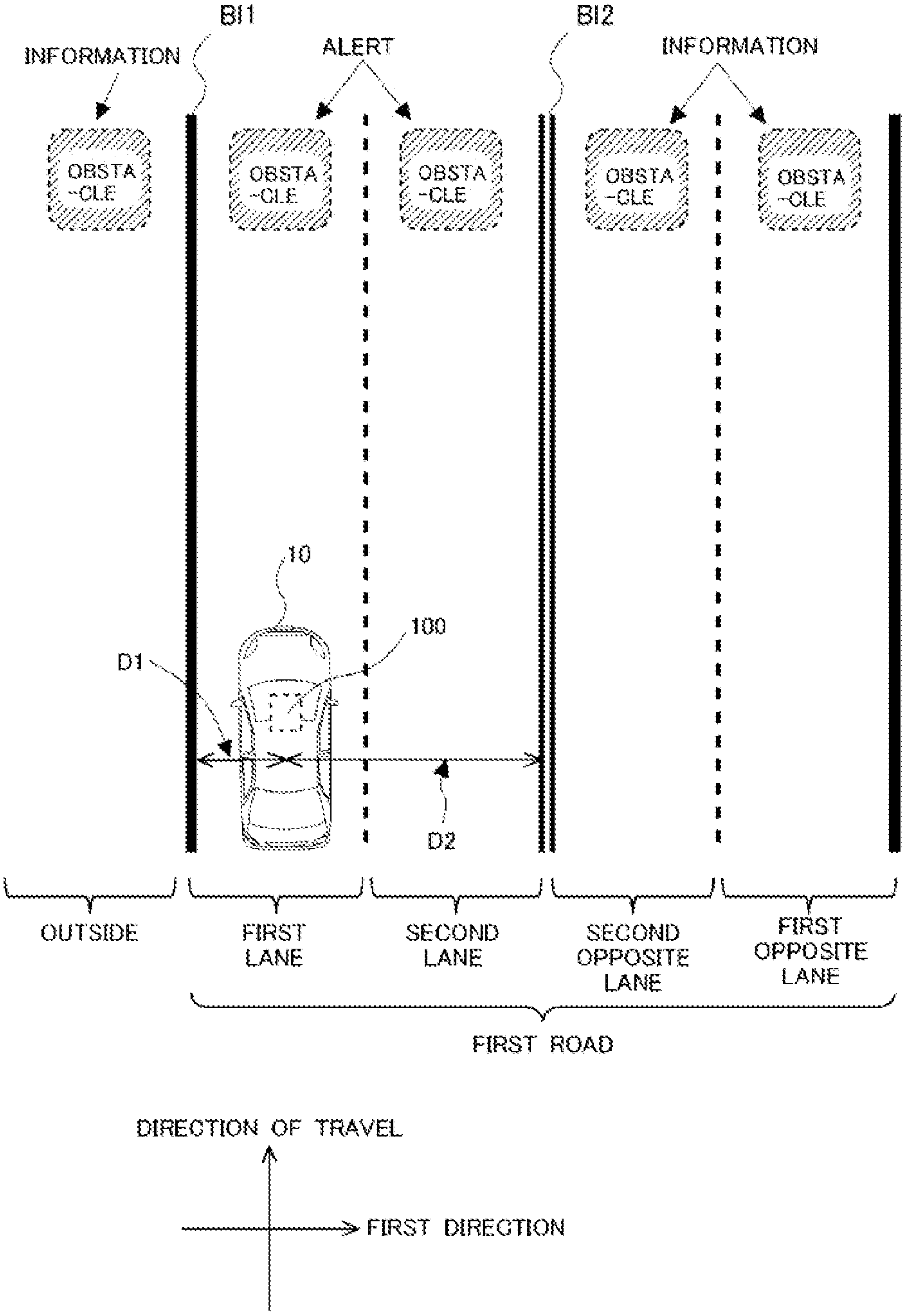

[Fig. 2]
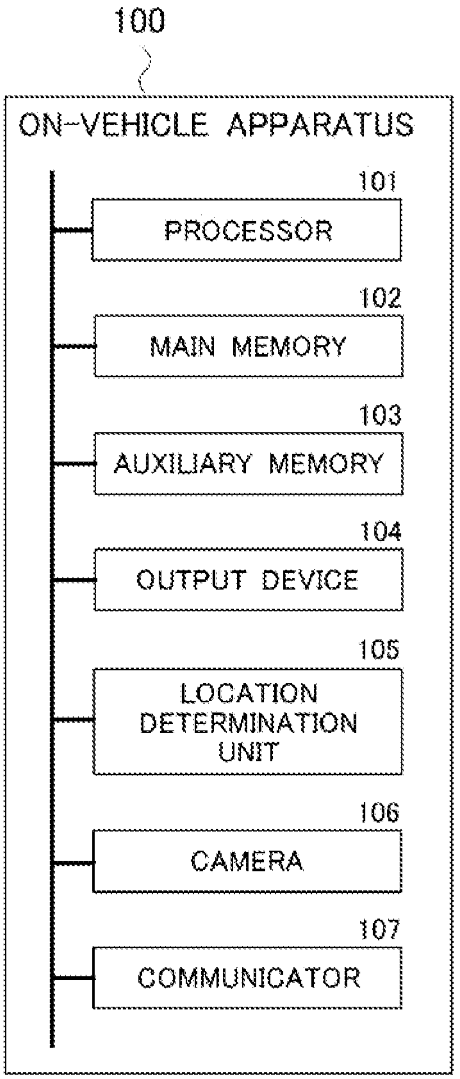

[Fig. 3]
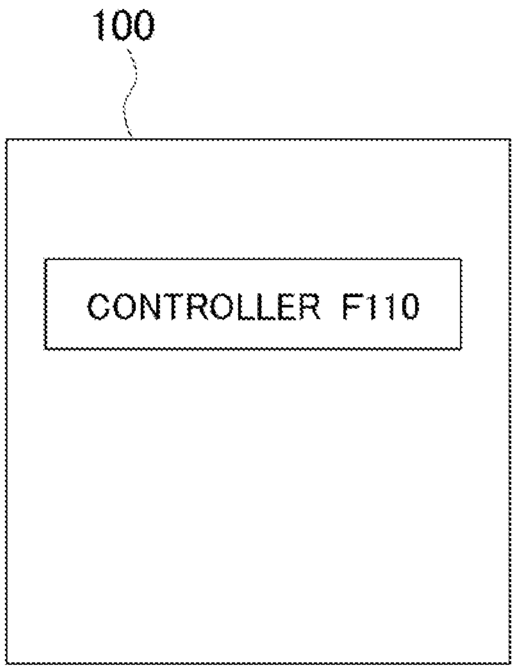

[Fig. 4]
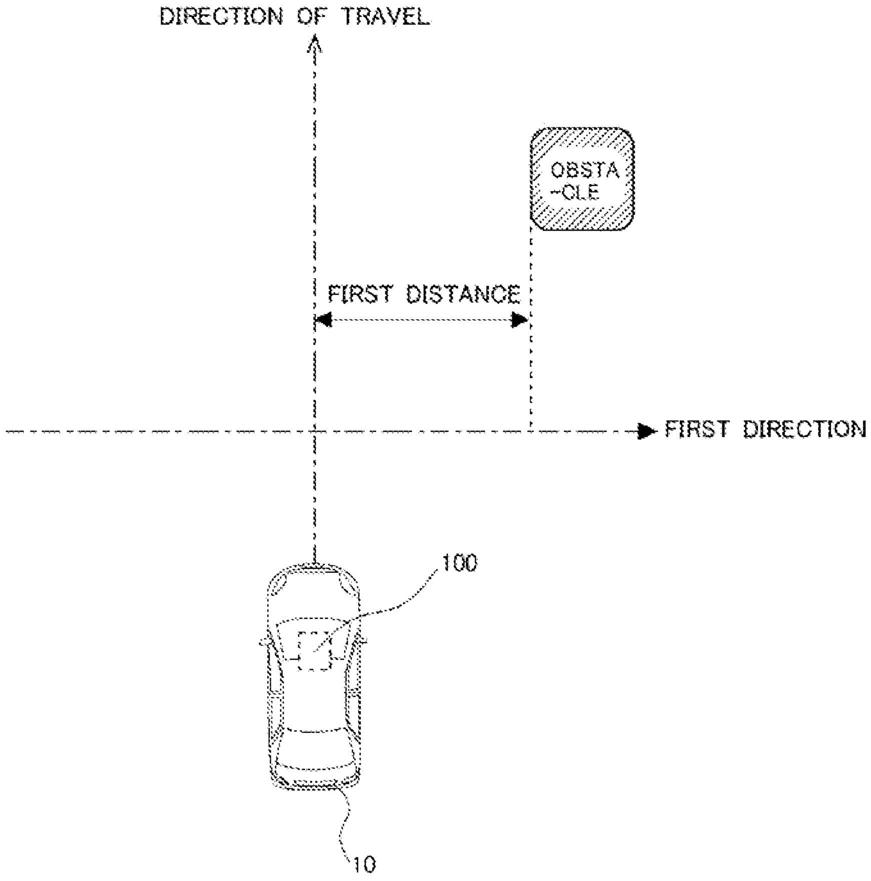

[Fig. 5]
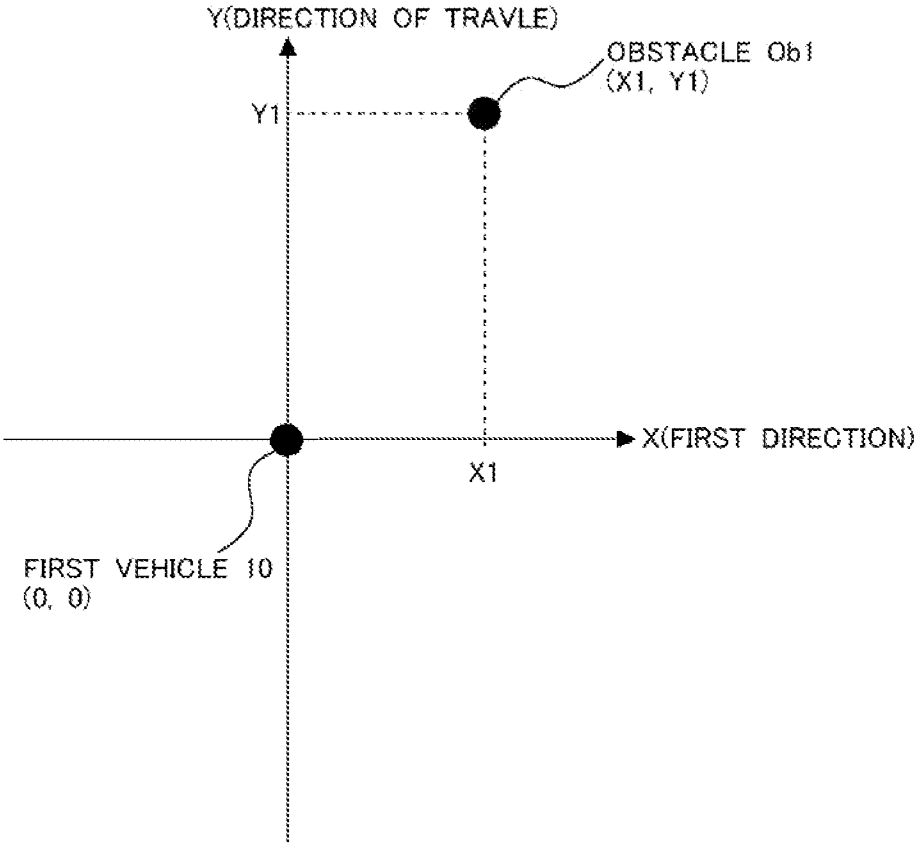

[Fig. 6]
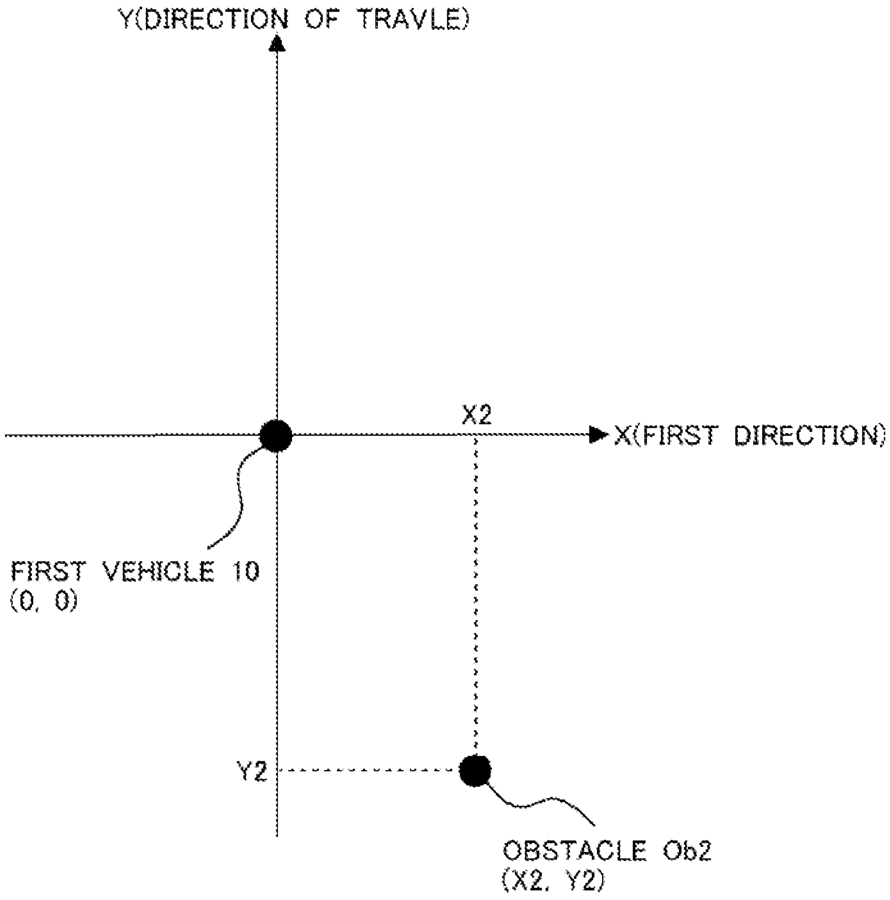

[Fig. 7]
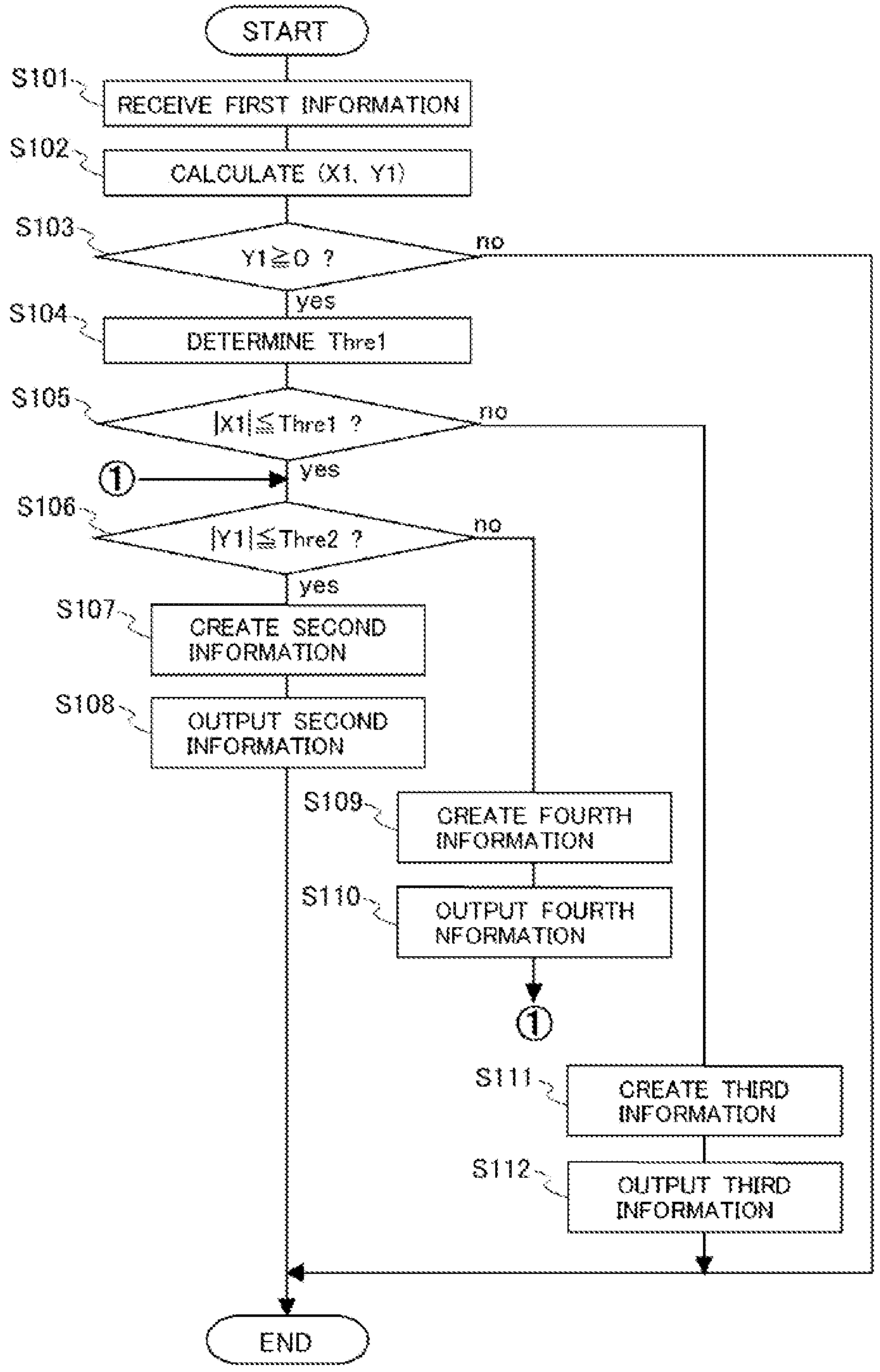

[Fig. 8]
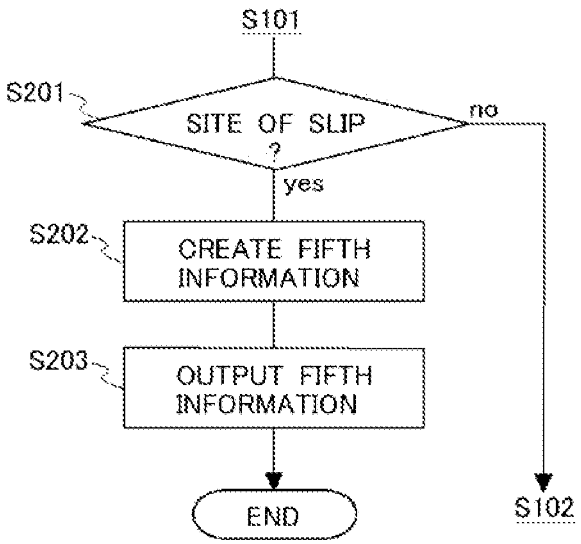

INFORMATION PROCESSING APPARATUS AND INFORMATION PROCESSING METHOD

CROSS REFERENCE TO THE RELATED APPLICATION

This application claims the benefit of Japanese Patent Application No. 2022-185877, filed on Nov. 21, 2022, which is hereby incorporated by reference herein in its entirety.

BACKGROUND

Technical Field

The present disclosure relates to an information processing apparatus and an information processing method.

Description of the Related Art

There is known technology for detecting an obstacle in front of a vehicle and providing information about the obstacle to another vehicle (for example, see Patent Literature 1 in the citation list below).

In a blind-spot support information notification device that notifies the driver of a vehicle of blind-spot support information to assist in visibility of blind spots around the vehicle, there is known technology that restricts the notification of blind-spot support information when the movement of the vehicle is already restricted by the presence of a preceding vehicle (for example, see Patent Literature 2 in the citation list below).

CITATION LIST

Patent Literature

Patent Literature 1: Japanese Patent Application Laid-Open No. H10-079100

Patent Literature 2: Japanese Patent Application Laid-Open No. 2007-233864.

SUMMARY

An object of this disclosure is to provide a technology that makes it possible to notify the driver of a vehicle of information appropriate for the level of countermeasures that the driver is required to take.

In one aspect of the present disclosure, there is provided an information processing apparatus provided on a first vehicle that is a connected vehicle capable of performing V2X (Vehicle-to-Everything) communication. For example, the information processing apparatus may comprise a controller including at least one processor that is configured to execute the processing of:

- receiving first information including location information of a first object;
- calculating a first distance based on the location information included in the first information, the first distance being the relative distance between the first object and the first vehicle along a first direction that is horizontal and perpendicular to the direction of travel of the first vehicle; and
- determining, based on the first distance, whether or not it is necessary to output second information to caution about the first object.

In another aspect of the present disclosure, there is provided an information processing method implemented by a computer provided in a first vehicle that is a connected vehicle capable of performing V2X communication. For example, the computer may execute the processing of:

- receiving first information including location information of a first object;
- calculating a first distance based on the location information included in the first information, the first distance being the relative distance between the first object and the first vehicle along a first direction that is horizontal and perpendicular to the direction of travel of the first vehicle; and
- determining, based on the first distance, whether or not it is necessary to output second information to caution about the first object.

According to other aspects, there are also provided an information processing program configured to cause a computer to implement the above-described information processing method and a non-transitory storage medium in which such an information processing program is stored.

According to the present disclosure, there is provided a technology that makes it possible to notify the driver of a vehicle of information appropriate for the level of countermeasures that the driver is required to take.

BRIEF DESCRIPTION OF THE DRAWINGS

FIG. 1 is a diagram illustrating the general configuration of a system according to an embodiment.

FIG. 2 is a diagram illustrating an exemplary hardware configuration of an on-vehicle apparatus according to the embodiment.

FIG. 3 is a diagram illustrating exemplary functional configuration of the on-vehicle apparatus according to the embodiment.

FIG. 4 is a diagram illustrating a first distance.

FIG. 5 is a diagram illustrating an example of a first coordinate system.

FIG. 6 is a diagram illustrating another example of the first coordinate system.

FIG. 7 is a flow chart of a process executed in the on-vehicle apparatus according to the embodiment.

FIG. 8 is a flow chart of a process executed in the on-vehicle apparatus according to a modification.

DETAILED DESCRIPTION

Communication technologies for vehicles such as V2X (Vehicle to Everything) communication have been developed in recent years. For example, when the airbag inflates in a connected vehicle capable of performing V2X communication, in other words when an accident occurs with the vehicle, it can transmit information n (first information) including information on the accident location (i.e., the location of the vehicle) to other connected vehicles present around it. When a connected vehicle or a roadside apparatus detects an obstacle (e.g., a vehicle in accident, a service vehicle, a vehicle in trouble, or a fallen object), it can transmit information (first information) including information on the location of the obstacle to connected vehicles around it. Consequently, the connected vehicles that have received the first information mentioned above can notify the drivers of the information on the obstacle to alert them to the obstacle.

The first information mentioned above can be received by the connected vehicles located within the communication area of the V2X communication, that is, for example, within a distance of the order of several hundred meters to several kilometers from the connected vehicle that transmits the information. However, the level of countermeasures that the drivers of the connected vehicles that have received the first information are required to take varies depending on the distance between the connected vehicles and the obstacle. For example, when the obstacle is located in the lane in which a connected vehicle is travelling or in a lane adjacent to the lane in which the connected vehicle is travelling, the driver of the connected vehicle is required to take a high level of countermeasures such as driving maneuver to avoid the obstacle. In contrast, when the lane in which the vehicle is travelling is not adjacent to the lane in which the obstacle is located, or when the connected vehicle is travelling a road other than the road in which the obstacle is located, the level of countermeasures that the driver of the connected vehicle is required to take is low.

For the above reason, it is desired that the connected vehicle that has received the first information notify the driver of appropriate information according to the level of countermeasures that the driver is required to take. The apparatus that performs V2X communication may not have map data in some cases. Then, it is necessary to determine the positional relationship between the connected vehicle and the obstacle by some means without using map data.

In view of the above, when the information processing apparatus according to the present disclosure that is provided on a first vehicle receives the first information including location information of a first object, a controller of the information processing apparatus calculates a relative distance (first distance) between the first object and the first vehicle along a first direction that is horizontal and perpendicular to the direction of travel of the first vehicle. The information processing apparatus according to the present disclosure is a computer provided on a connected vehicle (first vehicle) that is capable of performing V2X (Vehicle-to-Everything) communication. Examples of the first object include a site of slip of another vehicle (namely, a site where a slip of another vehicle occurred) and a fire site in addition to an obstacle, such as a vehicle in accident, a service vehicle, a vehicle in trouble, or a fallen object.

The controller determines, based on the first distance, whether or not it is necessary to output second information to caution about the first object. For example, the controller may be configured to output the second information when the first distance is not longer than a first threshold. Moreover, the controller may be configured not to output the second information when the first distance is longer than the first threshold. For example, the first threshold is such a value not larger than the first distance which the driver is supposed to be required to take a high level of countermeasures such as driving maneuver to avoid an obstacle. In other words, the first threshold is such a value not larger than the first distance which it can be assumed that the location of the first object is likely to be in the lane in which the first vehicle is travelling or in a lane adjacent to the lane in which the first vehicle is travelling. The second information mentioned above includes information to prompt the driver to prepare for required operations such as driving maneuver to avoid the first object in addition to information about the first object (e.g., information indicating the location or the type of the first object). For example, the second information is output by displaying characters or a figure that represents the second information on a display provided in the first vehicle or by outputting sound that represents the second information from a speaker provided in the first vehicle. Thus, the driver can be notified of the second information only in cases where the level of countermeasures that the driver is required to take is high. In this way, it is possible to cause the driver to be aware of the importance of the second information with improved reliability.

The controller of the information processing apparatus according to the present disclosure may be configured to determine whether the location of the first object is to the right or to the left of the path of travel of the first vehicle when the first distance is longer than the first threshold. The controller may be configured to output third information to notify the driver of the first vehicle of the presence of the first object to the right or to the left of the path of travel of the first vehicle. Thus, it is possible to inform the driver of only the direction in which the first objected is located when the first distance is longer than the first threshold. In this way, when the level of countermeasures that the driver is required to take is low, the third information of which the alert level is lower than that of the second information is output to alert the driver with reduced inconvenience.

The controller of the information processing apparatus according to the present disclosure may be configured to calculate a relative distance (second distance) between the first object and the first vehicle along the direction of travel of the first vehicle, when the first distance is not longer than the first threshold. The controller may be configured to output the second information when the second distance is not longer than a second threshold. Moreover, when the second distance is longer than the second threshold, the controller may be configured not to output the second information but to output fourth information to notify the driver of the first vehicle of the presence of the first object in the traveling direction of the first vehicle. The second threshold mentioned above is such a value not larger than the second distance which it can be predicted that the driver of the first vehicle is likely to be required to immediately take a high level of countermeasures.

When the second distance is relatively long, the time taken for the first vehicle to come near the first object will be relatively long, even if the first distance is not longer than the first threshold. Then, in consequence, it is not likely that the driver of the first vehicle is required to immediately take a high level of countermeasures. If the second information is output when the second distance is relatively long, the attentiveness of the driver may decrease, or the driver may become distrustful of the second information. In the case of the above configuration, when the second distance is longer than the second threshold, the controller outputs the fourth information instead of the second condition, even if the first distance is not longer than the first threshold, thereby informing the driver only of that the first object may present in the lane in which the first vehicle is travelling or in a lane adjacent to the lane in which the first vehicle is travelling. This can prevent decreases in the attentiveness of driver and the driver's distrust of the second information.

The controller of the information processing apparatus according to the present disclosure may be configured to output the second information at the time when the second distance becomes not longer than the second threshold after outputting the fourth information. In this way, it is possible to timely prompt the driver of the first vehicle to prepare for required operations such as driving maneuver to avoid the first object.

The controller of the information processing apparatus according to the present disclosure may be configured to output the second information, the third information, and the fourth information in different manners. For example, the controller may output the second information, the third information, and the fourth information in different display colors, at different volumes of sound, or in different tones of sound. This allows the driver to perceive the difference in the importance of the second information, the third information, and the fourth information.

In the case where the first object is a site of slip of another vehicle, the controller of the information processing apparatus according to the present disclosure may be configured to output fifth information to alert the driver to slipping regardless of the first distance. This is because if the slip of the other vehicle is due to icy road, there is a possibility that the road surface is icy not only at the site of slip of the other vehicle but also in the area around this site. The fifth information mentioned above may include information to prompt the driver to prepare for required operations such as driving maneuver to avoid slipping in addition to information indicating an area including the site of slip.

In another aspect of the present disclosure, the technology disclosed herein can be identified as an information processing method that is implemented by a computer that performs the processing of the information processing apparatus described above. The information processing method can accomplish the advantageous effects same as the information processing apparatus described above. In still another aspect of the present disclosure, the technology disclosed herein can also be identified as a program configured to cause a computer to perform the processing of the information processing apparatus described above or a non-transitory storage medium that stores such a program.

In the following, a specific embodiment of the technology disclosed herein will be described with reference to the drawings. It should be understood that hardware configurations, module configurations, and functional configurations that will be described in the following description of the embodiment are not intended to limit the technical scope of the disclosure only to them, unless otherwise stated.

Embodiment

In the following description of the embodiment, a case where the information processing apparatus according to the present disclosure is applied to a system that provides driving assistance for connected vehicles using V2X communication will be described.

(General Configuration of System)

FIG. 1 is a diagram illustrating the general configuration of a system according to the embodiment. The system according to the embodiment includes a first vehicle 10 and an on-vehicle apparatus 100. The first vehicle 10 is a connected vehicle driven by a user to whom driving assistance is provided. The on-vehicle apparatus 100 is a computer provided in the first vehicle 10, which is an example of the information processing apparatus according to the present disclosure.

The on-vehicle apparatus 100 receives first information using V2X communication. The first information according to the embodiment is information on an obstacle on the road. The term "obstacle" as used in the description of the embodiment refers to an object that should not normally be present on the road. Examples of the obstacle include a vehicle in accident (or a vehicle in which the airbag has inflated), a vehicle in trouble, a service vehicle, and a fallen object (including a part dropped or scattered from the vehicle). Such obstacles are examples of the first object according to the present disclosure.

The first information according to the embodiment is information including at least location information of the obstacle. The first information is transmitted from an on-vehicle apparatus provided on a vehicle other than the first vehicle or a roadside apparatus by broadcast. Examples of the aforementioned vehicle other than the first vehicle include a vehicle in accident, a vehicle that has detected a vehicle in accident, a vehicle in trouble, a vehicle that has detected a vehicle in trouble, a service vehicle, and a vehicle that has detected a service vehicle.

When the on-vehicle apparatus 100 receives the first information, it notifies the user of the first vehicle 10 of information on the obstacle with a content appropriate for the level of countermeasures that the user of the first vehicle 10 is required to take in a manner appropriate for the required level of countermeasures. More specifically, in the case where the level of countermeasures that the obstacle requires the user of the first vehicle 10 to take is high, the on-vehicle apparatus 100 notifies the user of information of a high alert level. In the case where the level of countermeasures that the obstacle requires the user of the first vehicle 10 to take is low, the on-vehicle apparatus 100 notifies the user of information of a low alert level.

Examples of the level of countermeasures that the user of the first vehicle 10 is required to take will now be described with reference to FIG. 1. FIG. 1 illustrates a first road that has two lanes in each direction, where the first vehicle 10 is travelling in the first lane. When the obstacle is located in the first lane or the second lane adjacent to the first lane in the direction of travel of the first vehicle 10, the level of countermeasures that the user of the first vehicle 10 is required to take is high. In other words, it is likely that the user of the first vehicle 10 is required to perform driving maneuver to avoid the obstacle. In contrast, when the obstacle is located in the first opposite lane or the second opposite lane of the first road, the level of countermeasures that the user of the first vehicle 10 is required to take is low. In other words, it is not likely that the user of the first vehicle 10 is required to perform driving maneuver to avoid the obstacle. Moreover, when the obstacle is located in the outside of the first road, the level of countermeasures that the user of the first vehicle 10 is required to take is low. For example, the outside of the first road includes roads other than the first road that are located in the communication range of the V2X communication (e.g., a by-path of the first road).

The on-vehicle apparatus 100 according to the embodiment is configured to notify the user of the first vehicle 10 of information of a high alert level only for obstacles that require the user to take a high level of countermeasures. In other words, the on-vehicle apparatus 100 provides an "alert" for such obstacles. The on-vehicle apparatus 100 according to the embodiment is also configured to notify the user of the first vehicle 10 of information on the presence of obstacles when the level of countermeasure that the user of the first vehicle 10 is required to take is low. In other words, the on-vehicle apparatus 100 provides "information" for such obstacles. In consequence the user of the first vehicle 10 can distinguish the levels of countermeasures that he or she is required to take.

(Hardware Configuration of On-Vehicle Apparatus)

FIG. 2 is a diagram illustrating an example of the hardware configuration of the on-vehicle apparatus 100 according to the embodiment. As illustrated in FIG. 2, the on-vehicle apparatus 100 according to the embodiment has a processor 101, a main memory 102, an auxiliary memory 103, an output device 104, a location determination unit 105, a camera 106, and a communicator 107. While FIG. 2 illustrates only hardware components that are related to driving assistance using V2X, the on-vehicle apparatus 100 may also include other hardware components.

The processor 101 is an arithmetic processing unit such as a CPU (Central Processing Unit) or a DSP (Digital Signal Processor). The processor 101 loads programs stored in the auxiliary memory 103 into the main memory 102 and executes them to control the on-vehicle apparatus 100.

The main memory 102 includes a semiconductor memory, such as a RAM (Random Access Memory) and a ROM (Read Only Memory). The main memory 102 provides a storage area and a work area into which programs stored in the auxiliary memory 103 are loaded. The main memory 102 is also used as a buffer for the arithmetic processing executed by the processor 101.

For example, the auxiliary memory 103 includes an EPROM (Erasable Programmable ROM) or an HDD (Hard Disk Drive). The auxiliary memory 103 may include a removable medium or a portable recording medium. Examples of the removable medium include a USB (Universal Serial Bus) memory and a disc recording medium, such as a CD (Compact Disc) or a DVD (Digital Versatile Disc). The auxiliary memory 103 stores various programs and data that the processor 101 uses when executing the programs.

The programs stored in the auxiliary memory 103 include an operating system (OS) and a special application program for causing the processor 101 to execute processing related to driving assistance using V2X.

The output device 104 is a device that presents information to the user of the first vehicle 10. The output device 104 used in the system according to the embodiment includes a display and a speaker. The display may be a multi-information display (MID) or a display of a navigation system with which the first vehicle 10 is equipped.

The location determination unit 105 is a device that determines the present location of the first vehicle 10. The location determination unit 105 used in the system according to the embodiment determines the present location of the first vehicle 10. For example, the location determination unit 105 is a GPS (Global Positioning System) receiver. The location determination unit 105 is not limited to a GPS receiver. For example, the location determination unit 105 may be a wireless communication circuit that uses a location information service based on Wi-Fi (registered trademark) access points. For example, the location information determined by the location determination unit 105 is geographical coordinates, such as the latitude and longitude.

The camera 106 captures images of the surroundings of the first vehicle 10. The camera 106 may be either a special camera or a camera of a drive recorder or an advanced safety system.

The communicator 107 is a device used to perform V2X communication. The communicator 107 used in the system according to the embodiment performs V2X communication using short range communication (communication through distances of the order of several hundred meters to several kilometers). For example, the communicator 107 performs V2X communication using wireless communication based on a communication standard such as Bluetooth (registered trademark) Low Energy (BLE), NFC (Near Field Communication), UWB (Ultra Wideband), DSRC (Dedicated Short-Range Communication), or Wi-Fi (registered trademark).

(Functional Configuration of On-Vehicle Apparatus)

The functional configuration of the on-vehicle apparatus 100 according to the embodiment will now be described with reference to FIG. 3. As illustrated in FIG. 3, the on-vehicle apparatus 100 has a controller F110 as its functional component. The functional configuration of the on-vehicle apparatus 100 is not limited to that illustrated in FIG. 3, but some may be added or the controller F110 may be replaced by other functional component.

The controller F110 is implemented by the processor 101 of the on-vehicle apparatus 100 by loading a program stored in the auxiliary memory 103 into the main memory 102 and executing it. Alternatively, the controller F110 may be implemented by a hardware circuit, such as an ASIC (Application Specific Integrated Circuit) or an FPGA (Field Programmable Gate Array).

The controller F110 receives first information transmitted from another vehicle or a roadside apparatus that is located within the communication area of V2X communication (e.g., an area within a distance of the order of several hundred meters to several kilometers from the first vehicle 10) through the communicator 107. The first information includes at least location information of an obstacle. For example, the location information of the obstacle is geographical coordinates of the obstacle, such as the latitude and longitude. The first information may include information indicating the type of the obstacle. Examples of the types of obstacle include vehicle in accident, vehicle in trouble, service vehicle, and fallen object. For example, the type of the obstacle may be determined by image recognition processing performed by the other vehicle or the roadside apparatus that has detected the obstacle.

The controller F110 calculates the first distance based on the location information included in the first information and the present location of the first vehicle 10. As illustrated in FIG. 4, the first distance is defined in this embodiment as the distance between the first vehicle 10 and the obstacle along a first direction that is horizontal (or parallel the road surface) and perpendicular to the direction of travel of the first vehicle 10.

A method of calculating the first distance will be described here with reference to FIG. 5. FIG. 5 illustrates an orthogonal coordinate system having its origin set at the present location of the first vehicle 10, which will also be referred to as the "first coordinate system" hereinafter. The Y axis in FIG. 5 represents the distance from the first vehicle 10 along the direction of travel of the first vehicle 10. The X axis in FIG. 5 represents the distance from the first vehicle 10 along the first direction.

When the communicator 107 of the on-vehicle apparatus 100 receives the first information, the controller F110 obtains the present t location (i.e., the geographical coordinates) of the first vehicle 10. The Control part F110 converts the geographical coordinates including the location information in the first information and the present location of the first vehicle 10 into coordinates in the first coordinate system illustrated in FIG. 5. Then, the controller F110 calculates the absolute value (|X1|) of the X coordinate (X1 in FIG. 5) of the obstacle Ob1 in the first coordinate system as the first distance.

The controller F110 determines a first threshold Thre1 based on the sign (i.e., positive/negative) of the X coordinate (X1) of the obstacle Ob1 in the first coordinate system. When the X coordinate (X1) of the obstacle Ob1 is zero or a positive value, it is considered that the obstacle Ob1 is located on the path of travel of the first vehicle 10 or to the right of the path of travel of the first vehicle 10. Then, the controller F110 determines whether there is an adjacent lane to the right of the lane in which the first vehicle 10 is travelling. For example, this determination is made by the controller F110 by performing image recognition processing on an image of the road that is captured by the camera 106. For example, in the case illustrated in FIG. 1 mentioned above, there is an adjacent lane (second lane) to the right of the lane in which the first vehicle 10 is travelling (first lane). In this case, it is determined that there is an adjacent lane to the right of the lane in which the first vehicle 10 is travelling. Then, the controller F110 performs image recognition processing to calculate the distance from the first vehicle 10 to the right boundary of the adjacent lane, which is, in the case illustrated in FIG. 1, the boundary B12 of the second lane and the second opposite lane. The controller F110 sets the distance thus calculated as the first threshold Thre1.

When the X coordinate (X1) of the obstacle Ob1 is zero or a negative value, it is considered that the obstacle Ob1 is located on the path of travel of the first vehicle 10 or to the left of the path of travel of the first vehicle 10. Then, the controller F110 determines whether there is an adjacent lane to the left of the lane in which the first vehicle 10 is travelling. For example, in the case illustrated in FIG. 1, there is no adjacent lane to the left of the lane in which the first vehicle 10 is travelling (first lane). In this case, it is determined that there is not an adjacent lane to the left of the lane in which the first vehicle 10 is travelling. Then, the controller F110 performs image recognition processing to calculate the distance from the first vehicle 10 to the left boundary of the road, which is, in the case illustrated in FIG. 1, the left boundary B11 of the first road. The controller F110 sets the distance thus calculated as the first threshold Thre1.

The controller F110 determines whether or not the first distance is not longer than the first threshold Thre1. If the first distance is not longer than the first threshold Thre1, it is considered that the obstacle Ob1 is located in the lane in which the first vehicle 10 is travelling or in a lane adjacent to the lane in which the first vehicle 10 is travelling. In this case, the user of the first vehicle 10 is required to take a high level of countermeasures, such as driving maneuver to avoid the obstacle Ob1. Therefore, when the first distance is not longer than the first threshold Thre1, it is necessary to notify the user of the first vehicle 10 of information of a high alert level.

However, even in the case where the obstacle Ob1 is located in the lane in which the first vehicle 10 is travelling or in a lane adjacent to the lane in which the first vehicle 10 is travelling, it will take a long time for the first vehicle 10 to reach the neighborhood of the obstacle Ob1 if the distance (second distance) between the first vehicle 10 and the obstacle Ob1 along the direction of travel of the first vehicle 10 is relatively long. Then, it is unlikely that the user of the first vehicle 10 is required to immediately take a high level of countermeasures. In contrast, if the second distance is relatively short, the time taken for the first vehicle 10 to reach the neighborhood of the obstacle Ob1 will be short. Then, it is likely that the user of the first vehicle 10 is required to immediately take a high level of countermeasures.

In view of the above, when it is determined that the first distance is not longer than the first threshold Thre1, the controller F110 in the system according to the embodiment determines whether or not the second distance is not longer than a second threshold Thre2. The second threshold Thre2 according to the embodiment is such a value not larger than the second distance which it is considered to be likely that the user of the first vehicle 10 is required to immediately take a high level of countermeasures. For example, the second threshold Thre2 is of the order of 100 meters. The second threshold Thre2 may be a variable value that is varied depending on the travelling speed of the first vehicle 10. Then, the higher the travelling speed of the first vehicle 10 is, the longer the second threshold Thre2 may be set.

In the first coordinate system illustrated in FIG. 5, the second distance is represented by the absolute value (|Y1|) of the Y coordinate (Y1) of the obstacle Ob1. Therefore, the controller F110 in the system according to the embodiment calculates the absolute value (|Y1|) of the Y coordinate (Y1) of the obstacle Ob1 in the first coordinate system as the second distance.

When it is determined that the second distance (|Y1|) is not longer than the second threshold Thre2, the controller F110 creates second information. The second information corresponds to the "alert" illustrated in FIG. 1. For example, the second information includes information that indicates the possibility that the obstacle Ob1 is present in the lane in which the first vehicle 10 is travelling or in a lane adjacent to the lane in which the first vehicle 10 is travelling, information on the distance to the obstacle Ob1 (i.e. the second distance |Y1|), and in addition information to prompt the driver to prepare for required operations such as driving maneuver to avoid the obstacle Ob1. The controller F110 outputs the second information created as above through output device 104. The controller F110 may display the second information as textual information on the display of the output device 104 or output the second information as voice information through the speaker of the output device 104. In the case where the second information is displayed as textual information on the display of the output device 104, a notification tone may also be output through the speaker of the output device 104 to call the user's attention.

When it is determined that the second distance (|Y1|) is longer than the second threshold Thre2, the controller F110 creates fourth information. The fourth information is information to notify the user of the presence of the obstacle Ob1. The alert level of the fourth information is lower than the second information. For example, the fourth information includes only information that indicates the possibility that the obstacle Ob1 is present in the lane in which the first vehicle 10 is travelling or in a lane adjacent to the lane in which the first vehicle 10 is travelling and information on the distance to the obstacle Ob1 (i.e., the second distance |Y1|).

When it is determined that the first distance is longer than the first threshold Thre1, the controller F110 creates third information. The third information is information to inform the user of whether the obstacle Ob1 is located to the right or to the left of the path of travel of the first vehicle 10. The alert level of the third information is lower than the second information and the fourth information. The third information corresponds to the "information" illustrated in FIG. 1. To create the third information, the controller F110 determines whether the obstacle Ob1 is located to the right or to the left of the path of travel of the first vehicle 10. When the obstacle Ob1 is located to the right of the path of travel of the first vehicle 10, the X coordinate (X1) of the obstacle Ob1 in the first coordinate system has a positive value. When the obstacle Ob1 is located to the left of the path of travel of the first vehicle 10, the X coordinate (X1) of the obstacle Ob1 in the first coordinate system has a negative value. The controller F110 determines whether the obstacle Ob1 is located to the right or to the left of the path of travel of the first vehicle 10 based on the sign (positive/negative) of the X coordinate (X1) of the obstacle Ob1 in the first coordinate system.

The second information, the third information, and the fourth information created by the controller F110 is output through the output device 104. Specifically, the controller F110 may display the information as textual information on the display of the output device 104 or output the information as sound information through the speaker of the output device 104. In the case where the controller F110 display the information as textual information on the display of the output device 104, it may also output a notification tone through the speaker of the output device 104 to call the user's attention.

The controller F110 may output the information in different manners among the second, third and fourth information. In the case where the controller F110 displays the information as textual information on the display of the output device 104, the color of the displayed text may be varied among the second, third and fourth information. In this case, the second information, of which the alert level is the highest, may be displayed in the color that is most effective in calling the user's attention. The third information, of which the alert level is the lowest, may be displayed in a color that is less effective in calling the user's attention than the fourth information. In consequence, the user can visually distinguish the difference in the alert level among the second, third and fourth information. The second information, of which the alert level is the highest, may be displayed in the color that is most effective in calling the user's attention and in addition, the display may be blinked to alert the user to the obstacle Ob1 more reliably.

In the case where the controller F110 outputs the information as sound information through the speaker of the output device 104, the tone or the volume of the sound may be varied among the second, third and fourth information. In this case, the second information, of which the alert level is the highest, may be output in the tone that is most effective in calling the user's attention or at the largest volume. The third information, of which the alert level is the lowest, may be output in a tone that is less effective in calling the user's attention than the fourth information or at a volume smaller than the fourth information. In consequence, the user can aurally distinguish the difference in the alert level among the second, third and fourth information.

The obstacle Ob1 is not always located in the traveling direction of the first vehicle 10. There can be cases where the communicator 107 of the first vehicle 10 receives the first information on the obstacle Ob1 that is located behind the travelling first vehicle 10. In such cases, the level of countermeasures that the user of the first vehicle 10 is required to take is very low. For this reason, the obstacles Ob1 located behind the first vehicle 10 are excluded from the notification in the system according to the embodiment. As illustrated in FIG. 6, when an obstacle Ob1 is located behind the first vehicle 10, the Y coordinate (Y1) of the obstacle Ob1 in the first coordinate system has a negative value. Therefore, when the Y coordinate (Y1) of the obstacle Ob1 in the first coordinate system has a negative value, the controller F110 does not perform processing of calculating the first distance, determining the first threshold Thre1, and notifying the user of information.

(Process Performed in On-Vehicle Apparatus)

A process performed in the on-vehicle apparatus 100 according to the embodiment will be described with reference to FIG. 7. FIG. 7 is a flow chart of a processing routine executed in the on-vehicle apparatus 100, which is triggered by the reception of the first information by the communicator 107 of the on-vehicle apparatus 100. While the processing routine according to the flow chart of FIG. 7 is executed by the processor 101 of the on-vehicle apparatus 100, a functional component (the controller F110) of the on-vehicle apparatus 100 will be mentioned in the following description as the component that executes the processing in the routine.

In the processing routine according to the flow chart of FIG. 7, when the communicator 107 of the on-vehicle apparatus 100 receives the first the first information is transferred from the communicator 107 to the controller F110. Thus, the controller F110 receives the first information through the communication part 107 (step S101). After completing the processing of step S101, the controller F110 executes the processing of step S102.

In step S102, the controller F110 calculates the X coordinate (X1) and the Y coordinate (Y1) of the obstacle Ob1 in the first coordinate system. Specifically, the controller F110 obtains the present location of the first vehicle 10 through the location determination unit 105. The controller F110 converts geographical coordinates of the location information included in the first information and the present location of the first vehicle 10 into coordinates in the first coordinate system illustrated in FIG. 5. The controller F110 calculates the X coordinate (X1) and the Y coordinate (Y1) of the obstacle Ob1 in the first coordinate system. After completing the processing of step S102, the controller F110 executes the processing of step S103.

In step S103, the controller F110 determines whether or not the Y coordinate (Y1) calculated in step S102 is not less than 0. When the Y coordinate (Y1) of the obstacle Ob1 in the first coordinate system has a negative value (negative answer in step S103), the obstacle Ob1 is located behind the travelling first vehicle 10. Then, the level of countermeasures that the user of the first vehicle 10 is required to take is very low, and therefore the controller F110 terminates execution of this processing routine. In consequence, the user is not notified of information on this obstacle Ob1. When the Y coordinate (Y1) of the obstacle Ob1 in the first coordinate system has a positive value (affirmative answer in step S103), the obstacle Ob1 is located in the traveling direction of the first vehicle 10. Then, the controller F110 executes the processing of step S104 onward.

In step S104, the controller F110 determines the first threshold Thre1. Specifically, when the X coordinate (X1) calculated in step S102 is 0 or a positive value, the controller F110 performs image recognition processing on an image captured by the camera 106 to determine whether there is an adjacent lane to the right of the lane in which the first vehicle 10 is travelling. If it is determined that there is an adjacent lane to the right of the lane in which the first vehicle 10 is travelling, the controller F110 calculates the distance from the first vehicle 10 to the right boundary of the adjacent lane. The controller F110 sets the calculated distance as the first threshold Thre1. If it is determined that there is not an adjacent lane to the right of the lane in which the first vehicle 10 is travelling, the controller F110 calculates the distance from the first vehicle 10 to the right boundary of the road that the first vehicle 10 is travelling. The controller F110 sets the calculated distance as the first threshold Thre1.

When the X coordinate (X1) calculated in step S102 is 0 or a negative value, the controller F110 performs image recognition processing on an image captured by the camera 106 to determine whether there is an adjacent lane to the left of the lane in which the first vehicle 10 is travelling. If it is determined that there is an adjacent lane to the left of the lane in which the first vehicle 10 is travelling, the controller F110 calculates the distance from the first vehicle 10 to the left boundary of the adjacent lane. The controller F110 sets the calculated distance as the first threshold Thre1. If it is determined that there is not an adjacent lane to the left of the lane in which the first vehicle 10 is travelling, the controller F110 calculates the distance from the first vehicle 10 to the left boundary of the road that the first vehicle 10 is travelling. The controller F110 sets the calculated distance as the first threshold Thre1.

After completing the processing of step S104, the controller F110 executes the processing of step S105. In step S105, the controller F110 determines whether or not the first distance is not longer than the first threshold Thre1 determined in step S104. In this processing, the controller F110 uses the absolute value (|X1|) of the X coordinate (X1) calculated in step S102 as the first distance. If the first distance (|X1|) is not longer than the first threshold Thre1 (affirmative answer in step S105), it is considered that the obstacle Ob1 is located in the traveling direction of the first vehicle 10 in the lane in which the first vehicle 10 is travelling or in a lane adjacent to the lane in which the first vehicle 10 is travelling. If step S105 is answered in the affirmative, the controller F110 executes the processing of step S106.

In step S106, the controller F110 determines whether or not the second distance is not longer than the second threshold Thre2. In this processing, the controller F110 uses the absolute value (|Y1|) of the Y coordinate (Y1) calculated in step S102 as the second distance. The second threshold Thre2 is a value not larger than the second distance (|Y1|) which it is considered likely that the user will be required to immediately take a high level of countermeasures to the obstacle Ob1 that is conjectured to be located in the lane in which the first vehicle 10 is travelling or in a lane adjacent to the lane in which the first vehicle 10 is travelling. As described above, the higher the travelling speed of the first vehicle 10 is, the larger the second threshold Thre2 may be set. If the second distance (|Y1|) is not longer than the second threshold Thre2 (affirmative answer in step S106), the controller F110 executes the processing of step S107.

In step S107, the controller F110 creates the second information. The second information is information to alert the user to the obstacle Ob1. As described above, the second information includes information that indicates the possibility that the obstacle Ob1 is present in the lane in which the first vehicle 10 is travelling or in a lane adjacent to the lane in which the first vehicle 10 is travelling, information on the distance to the obstacle Ob1 (i.e. the second distance |Y1|), and in addition information to prompt the driver to prepare for driving maneuver to avoid the obstacle Ob1. After completing the processing of step S107, the controller F110 executes the processing of step S108.

In step S108, the controller F110 outputs the second information created in step S107 through the output device 104. This allows the user to be aware of the possibility that the obstacle Ob1 is present in the lane in which the first vehicle 10 is travelling or in a lane adjacent to the lane in which the first vehicle 10 is travelling and the distance to the obstacle Ob1 and prompts the user to prepare for driving maneuver to avoid the obstacle Ob1. After completing the processing of step S108, the controller F110 terminates execution of this processing routine.

If step S106 is answered in the negative, namely if the second distance (|Y1|) is longer than the second threshold Thre2, the controller F110 executes the processing of step S109. In step S109, the controller F110 creates the fourth information. The alert level of the fourth information is lower than the second information. As described above, the fourth information includes only information that indicates the possibility that the obstacle Ob1 is located in the lane in which the first vehicle 10 is travelling or in a lane adjacent to the lane in which the first vehicle 10 is travelling and information on the distance to the obstacle Ob1 (i.e. the second distance (|Y1|). After completing the processing of step S109, the controller F110 executes the processing of step S110.

In step S110, the controller F110 outputs the fourth information created in step S109 through the output device 104. In this processing the controller F110 may output the fourth information in a display color, in a tone of sound, or at a volume that is less effective in calling user's attention than the second information. Thus, it is possible to inform the user only of the possibility that the obstacle Ob1 is located in the lane in which the first vehicle 10 is travelling or in a lane adjacent to the lane in which the first vehicle 10 is travelling and the distance to the obstacle Ob1. After completing the processing of step S110, the controller F110 executes the processing of step S106 onward. Then, if the second distance (|Y1|) is not longer than the second threshold Thre2 (affirmative answer in step S106), the controller F110 outputs the second information.

If step S105 is answered in the negative, namely if the first distance (|X1|) is longer than the first threshold Thre1, it is considered that the obstacle On1 is not located in the lane in which the first vehicle 10 is travelling or in a lane adjacent to the lane in which the first vehicle 10 is travelling. In this case, the level of countermeasures that the user of the first vehicle 10 is required to take is lower than in the case where the obstacle Ob1 is located in the lane in which the first vehicle is travelling or in a lane adjacent to the lane in which the first vehicle 10 is travelling. Then, the controller F110 executes the processing of step S111.

In step S111, the controller F110 creates the third information of which the alert level is lower than the second information and the fourth information. The third information includes information that indicates whether the obstacle Ob1 is located to the right or to the left of the path of travel of the first vehicle 10. Whether the obstacle Ob1 is located to the right or to the left of the path of travel of the first vehicle 10 is determined based on the sign (positive/negative) of the X coordinate (X1) calculated in step S102. After completing the processing of step S111, the controller F110 executes the processing of step S112.

In step S112, the controller F110 outputs the third information created in step S111 through the output device 104. In this processing, the controller F110 may output the third information in a display color, in a tone of sound, or at a volume that is less effective in calling user's attention than the second information and the fourth information. Thus, in the case where the obstacle Ob1 is not located in the lane in which the first vehicle 10 is travelling or in a lane adjacent to the lane in which the first vehicle 10 is travelling, it is possible to inform the user only of whether the obstacle Ob1 is located to the right or to the left of the path of travel of the first vehicle 10. After completing the processing of step S112, the controller F110 terminates execution of this processing routine.

(Operation and Advantageous Effects of System According to Embodiment)

In the system according to the above-described embodiment, when the on-vehicle apparatus 100 receives the first information, it notifies the user of the first vehicle 10 of information on the obstacle with a content appropriate for the level of countermeasures that the user of the first vehicle 10 is required to take in a manner appropriate for the required level of countermeasures. Specifically, in the case where there is a possibility that the obstacle Ob1 is located in the lane in which the first vehicle 10 is travelling or in a lane adjacent to the lane in which the first vehicle 10 is travelling, if the user is required to immediately take a high level of countermeasures such as driving maneuver to avoid the obstacle Ob1 (in other words, if the second distance is not longer than the second threshold), the controller F110 notifies the user of the second information, of which the alert level is the highest. Also in the case where there is a possibility that the obstacle Ob1 is located in the lane in which the first vehicle 10 is travelling or in a lane adjacent to the lane in which the first vehicle 10 is travelling, if the user is not required to immediately take a high level of countermeasures such as driving maneuver to avoid the obstacle Ob1 (in other words, if the second distance is longer than the second threshold), the controller F110 notifies the user of the fourth information, of which the alert level is lower than the second information. When the obstacle Ob1 is not located in the lane in which the first vehicle 10 is travelling or in a lane adjacent to the lane in which the first vehicle 10 is travelling, the user is not required to take a high level of countermeasures such as driving maneuver to avoid the obstacle Ob1. Then, the controller F110 notifies the user of the third information, of which the alert level is the lowest.

As above, the system according to the embodiment enables the user of the first vehicle 10 to distinguish the levels of countermeasures according to the information given to him/her. Therefore, the user can be aware of the importance of the second information, of which the level of countermeasures that the user is required to take is the highest, with improved reliability. In the case where the level of the countermeasures that the user is required to take by an obstacle is low, the user is only given information on the location of the obstacle. Thus, it is possible to alert the user to the obstacle without making him/her inconvenienced.

<Modification>

In the above description of the embodiment, we have described a case where the "first object" according to the present disclosure is an obstacle. In the following description of a modification, we will describe a case where the "first object" includes a site of slip of another vehicle in addition to an obstacle.

In the case where an object to which the first information is related is a site of slip of another vehicle (namely, a site where a slip of another vehicle occurred), the controller F110 may be configured to output fifth information to alert the user to slipping regardless of the first distance. This is because if the slip of the other vehicle is due to icy road, there is a possibility that the road surface is icy not only at the site of slip of the other vehicle but also in the area around this site. The fifth information according to the modification has the alert level same as the second information described above. For example, the fifth information includes information to prompt the driver to prepare for required operations such as driving maneuver to avoid slipping in addition to information indicating an area including the site of slip.

A process performed in the on-vehicle apparatus 100 according to the modification will be described with reference to FIG. 8. FIG. 8 is a flow chart of a portion of a processing routine executed in the on-vehicle apparatus 100, which is triggered by the reception of the first information by the communicator 107 of the on-vehicle apparatus 100. FIG. 8 illustrates the portion of the processing that is different from the processing according to the above embodiment (i.e., the processing routine according to the flow chart of FIG. 7). Specifically, FIG. 8 is the flow chart of the processing that is executed in the on-vehicle apparatus 100 according to the modification after the processing of step S101 in the processing routine of FIG. 7 is executed.

In the processing routine according to the flow chart of FIG. 8, the controller F110 executes the processing of step S201 after executing the processing of step S101 in FIG. 7. In step S201, the controller F110 determines whether or not the object to which the first information is related is a site of slip of another vehicle. It is assumed that the first information according to the modification includes information that distinguishes whether the object to which the first information is related is an obstacle or a site of slip. If the object to which the first information is related is an obstacle (negative answer in step S201), the controller F110 executes the processing same as the processing of steps S102 through S112. If the object to which the first information is related is a site of slip (affirmative answer in step S201), the controller F110 executes the processing of step S202.

In step S202, the controller F110 creates the fifth information. The fifth information includes information to prompt the user to prepare for driving maneuver to avoid slipping in addition to information indicating an area including the site of slip. The area including the site of slip indicated by the information may be a district (e.g., city, ward, or town) in which the site of slip is located. After completing the processing of step S202, the controller F110 executes the processing of step S203.

In step S203, the controller F110 outputs the fifth information created in step S202 through the output device 104. In this processing, the controller F110 may output the fifth information in the display color, in the tone of sound, or at the volume same as the second information. After completing the processing of step S203, the controller F110 terminates execution of the processing routine without executing the processing of steps S102 through S112 in FIG. 7.

In the case where the object to which the first information is related is a site of slip of another vehicle, the system according to the modification can notify the user of the first vehicle 10 of information of a high alert level. In consequence, the user can regard the fifth information as important as the second information.

<Others>

The above embodiment has been described only by way of example. The technology disclosed herein can be implemented in modified manners without departing from the essence of this disclosure. For example, features of the embodiment and the modification described above may be adopted in desired combinations, if it is technically feasible to do so.

One or some of the processes that have been described as processes performed by one apparatus may be performed by a plurality of apparatuses in a distributed manner. One or some of the processes that have been described as processes performed by different apparatuses may be performed by one apparatus. The hardware configuration used to implement various functions in a computer system may be modified flexibly.

The technology disclosed herein can be implemented by supplying a computer program (information processing program) or programs configured to implement the functions described in the above description of the embodiment to a computer to cause one or more processors of the computer to read out and execute the program or programs. Such a computer program or programs may be supplied to the computer by a non-transitory, computer-readable storage medium that can be connected to a system bus of the computer or through a network. The non-transitory, computer-readable storage medium is a recording medium that can store information such as data and programs electrically, magnetically, optically, mechanically, or chemically in a computer-readable manner. Examples of such a recording medium include any type of discs including magnetic discs, such as a floppy disc (registered trademark) and a hard disk drive (HDD), and optical discs, such as a CD-ROM, a DVD, and a Blu-ray disc. The non-transitory, computer-readable storage medium may also be a ROM, a RAM, an EPROM, an EEPROM, a magnetic card, a flash memory, an optical card, an SSD (Solid State Drive), or other medium.

What is claimed is:

1. An information processing apparatus provided on a first vehicle that is a connected vehicle capable of performing V2X (Vehicle-to-Everything) communication, comprising a controller including at least one processor, the controller being configured to execute the processing of:

receiving first information including location information of a first object;

calculating a first distance based on the location information included in the first information, the first distance being a relative distance between the first object and the first vehicle along a first direction that is horizontal and perpendicular to a direction of travel of the first vehicle;

determining, based on the first distance, whether or not it is necessary to output second information to caution about the first object;

outputting the second information, when the first distance is not longer than a first threshold;

not outputting the second information, when the first distance is longer than the first threshold; and when the first distance is longer than the first threshold:

determining whether a location of the first object is to the right or to the left of a path of travel of the first vehicle; and outputting third information to inform a driver of the first vehicle of a presence of the first object to the right or to the left of the path of travel of the first vehicle.

2. The information processing apparatus according to claim 1, wherein the controller is configured to further execute the following processing, when the first distance is not longer than the first threshold:

calculating a second distance, the second distance being a relative distance between the first object and the first vehicle along the direction of travel of the first vehicle;

outputting the second information, when the second distance is not longer than a second threshold; and outputting fourth information to inform the driver of the first vehicle that the first object is present in the traveling direction of the travelling first vehicle without outputting the second information, when the second distance is longer than a second threshold.

3. The information processing apparatus according to claim 2, wherein the controller outputs the second information at a time when the second distance becomes not longer than the second threshold after outputting the fourth information.

4. The information processing apparatus according to claim 3, wherein the controller outputs the second information, the third information, and the fourth information in different manners.

5. The information processing apparatus according to claim 4, wherein the controller outputs the second information, the third information, and the fourth information in different display colors.

6. The information processing apparatus according to claim 4, wherein the controller outputs the second information, the third information, and the fourth information at different volumes of sound.

7. The information processing apparatus according to claim 4, wherein the controller outputs the second information, the third information, and the fourth information in different tones of sound.

8. The information processing apparatus according to claim 1, wherein in the case where the first object is a site of slip of another vehicle, the controller outputs fifth information to caution about slipping regardless of the first distance.

9. An information processing method comprising the following processing executed by a computer provided in a first vehicle that is a connected vehicle capable of performing V2X (Vehicle-to-Everything) communication:

receiving first information including location information of a first object:

calculating a first distance based on the location information included in the first information, the first distance being a relative distance between the first object and the first vehicle along a first direction that is horizontal and perpendicular to a direction of travel of the first vehicle;

determining, based on the first distance, whether or not it is necessary to output second information to caution about the first object;

outputting the second information, when the first distance is not longer than a first threshold:

not outputting the second information, when the first distance is longer than the first threshold; and when the first distance is longer than the first threshold:

determining whether a location of the first object is to the right or to the left of a path of travel of the first vehicle; and outputting third information to inform a driver of the first vehicle of a presence of the first object to the right or to the left of the path of travel of the first vehicle.

10. The information processing method according to claim 9, wherein the computer is configured to further execute the following processing, when the first distance is not longer than the first threshold:

calculating a second distance, the second distance being a relative distance between the first object and the first vehicle along the direction of travel of the first vehicle;

outputting the second information, when the second distance is not longer than a second threshold; and outputting fourth information to inform the driver of the first vehicle that the first object is present in the traveling direction of the travelling first vehicle without outputting the second information, when the second distance is longer than a second threshold.

11. The information processing method according to claim 10, wherein the computer outputs the second information at a time when the second distance becomes not longer than the second threshold after outputting the fourth information.

12. The information processing method according to claim 11, wherein the computer outputs the second information, the third information, and the fourth information in different manners.

13. The information processing method according to claim 12, wherein the computer outputs the second information, the third information, and the fourth information in different display colors.

14. The information processing method according to claim 12, wherein the computer outputs the second information, the third information, and the fourth information at different volumes of sound.

15. The information processing method according to claim 12, wherein the computer outputs the second information, the third information, and the fourth information in different tones of sound.

16. The information processing method according to claim 9, wherein in the case where the first object is a site of slip of another vehicle, the computer outputs fifth information to caution about slipping regardless of the first distance.

* * * * *